March 30, 1971  H. G. TANK  3,573,154
CORK UNDERLAYER MATERIAL
Filed April 3, 1967

INVENTOR
HENRY G. TANK

BY Wheeler, Wheeler, House & Clemency
ATTORNEYS

United States Patent Office 3,573,154
Patented Mar. 30, 1971

3,573,154
CORK UNDERLAYER MATERIAL
Henry G. Tank, Glendale, Wis., assignor to Connor
Forest Industries, Laona, Wis.
Filed Apr. 3, 1967, Ser. No. 627,817
Int. Cl. B32b 11/12, 19/02, 19/04
U.S. Cl. 161—162
9 Claims

ABSTRACT OF THE DISCLOSURE

Disclosed herein is an underlayer material for flooring installations or floor coverings, which material is in roll form and comprises a layer of natural cork bonded to an asphalt impregnated sheet. Also disclosed herein is a method of producing the underlayer material.

BACKGROUND OF INVENTION

The invention relates to underlayer materials for flooring installations including but not limited to hard wood and other floors, and to underlayer materials for floor coverings such as linoleum and carpeting.

SUMMARY OF INVENTION

The invention provides an underlayer material which is in roll form so as to afford especially economically installation and which provides superior resiliency and recoverability characteristics, as well as relatively low thermal and sound transmissability. In accordance with the invention, there is provided, in a roll, an underlayer material comprising a layer of natural cork bonded to an asphalt impregnated sheet. In the preferred embodiment, the natural cork layer is fabricated with a phenolic resin binder and has a density of 12 lbs. per cubic foot.

The method of the invention involves forming the natural cork into a log of the preferred density, slicing from the log an elongated sheet or layer or veneer of natural cork, bonding to one face of the cork an asphalt impregnated sheet of paper or felt to provide a laminate, and forming the resulting laminate into a roll.

Also in accordance with the invention, the asphalt impregnated sheet is of such physical properties as to restrain, in the absence of the application of exterior force, the inherent tendency of the natural cork to return to flat form. As a consequence of the restraint placed upon the inherent tendency of the cork to assume a flat form, the laminated product maintains itself in roll form until such time as it is desired to apply the laminate as an underlayer material. Availability of the disclosed underlayer material in roll form provides numerous advantages including economies in installation due to ease of handling, and lesser possibility of damage during transportation and on-the-job handling.

Other objects and advantages of the invention will become known by reference to the following drawings.

GENERAL DESCRIPTION

Figure 1:
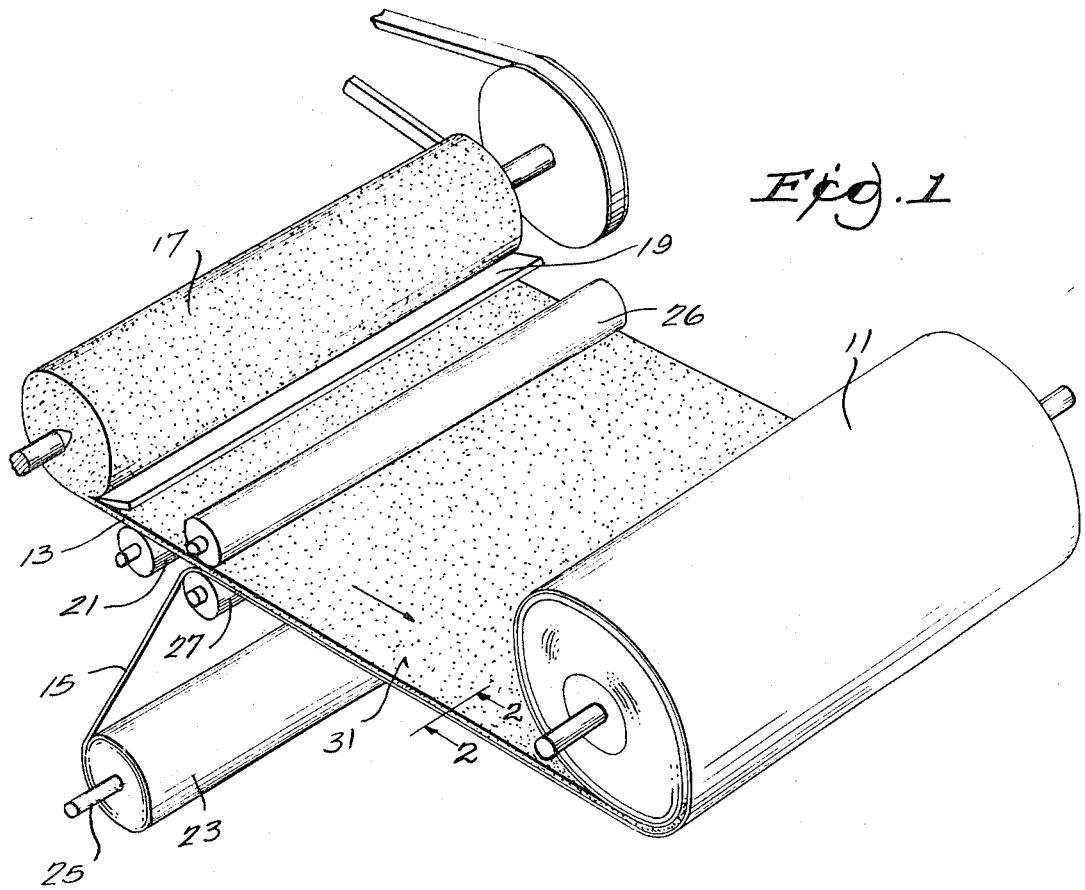
FIG. 1 is a perspective view schematically illustrating the method of producing the underlayer material disclosed herein and the resulting roll which is formed thereby.
Figure 2:
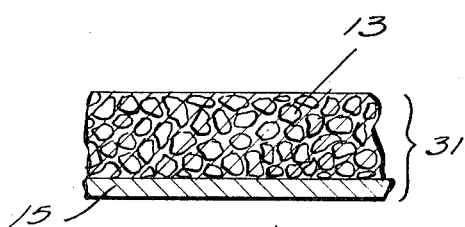
FIG. 2 is an enlarged fragmentary cross section of a portion of the underlayer material shown in FIG. 1.

Shown in the drawings is a roll 11 of underlayer material which comprises a layer 13 of natural cork bonded to an asphalt impregnated sheet or backing 15 of paper or felt.

Also shown schematically in the drawings is a method of producing the roll 11. Specifically, there is shown in FIG. 1 a log 17 of natural cork, which log has a density of approximately an average of 12 pounds per cubic foot and includes a phenolic resin binder. Use of a phenolic resin binder as compared to other binders such as asphalt permits the natural cork to retain its inherent properties of high resiliency and recoverability.

The log 17 is mounted for rotation relative to a blade or knife 19 which, as a consequence of log rotation, is effective to cut an elongated veneer, sheet or layer 13 of the cork, which layer has a natural tendency to lie flat and is at least partially supported by a roller 21.

Also shown in FIG. 1 is a roll 23 of the elongated sheet 15 of asphalt impregnated paper or felt which is supported for rotation on an arbor 25. In the preferred construction, a 15 lb. asphalt impregnated sheet is employed, which sheet meets A.S.T.M. Specification D–226 and Federal Specification H.H.–F.–191a.

The cork layer 13 and the asphalt impregnated sheet 15 are passed in face to face contact between a pair of rolls 26 and 27 which are adapted to form a laminate 31 by bonding the cork layer 13 to the asphalt impregnated sheet 15 with a hot asphalt which meets MIL–6–C–3029 specification. Various mechanisms well known in the art can be employed for bonding the sheet 15 and the cork layer 13.

After bonding of the cork layer 13 and asphalt sheet 15, the laminate 31 is formed about a core into the roll 11. It is to be noted that the laminate is formed into a roll so that the impregnated sheet or backing is on the outside of the roll so as to protect the cork from damage. Various mechanisms well known in the art can be employed for advancing the sheet and the cork layer as well as the laminate and for forming the laminate into the roll 11. One resulting roll of underlayer material has a length of 70 feet and a width of two feet. The laminate preferably has a thickness of about 3/16 of an inch, but can be made within a range of from about 1/8 to about 1/4 inch.

As noted previously, the cork layer 13 preferably has an average density of 12 pounds per cublic foot and has, as a consequence of being cut into a veneer from a log, a tendency to remain flat. In accordance with the invention, bonding with hot asphalt and use of a 15-pound asphalt impregnated sheet imparts to the laminate sufficient resistance to the tendency of the cork to assume a flat form so that the laminate 31 will maintain itself in roll form in the absence of an externally applied force.

When installing the underlayer material, a relatively small force is sufficient to unroll the laminate 31 into flat form. Thus, there is produced a product which will retain itself in roll form notwithstanding the natural tendency of the cork to return to flat form, but which can nevertheless be readily unrolled into flat form by a workman.

One underlayer material made in accordance with the invention from natural cork with a phenolic resin binder and having an average density of 12 pounds per cubic foot, when bonded to a 15-pound asphalt impregnated sheet, has a compressibility factor of 57 percent, recoverability of 86 percent, a flexibility ratio of 1:5, and a tensile strength of between 60 to 90 pounds per square inch. By comparison, an asphalt impregnated cork formed between sheets of asphalt paper and tested according to A.S.T.M. F–36–61 T for one minute under a pressure of 100 pounds per square inch has a compressibility factor of 3.3 percent and a recoverability factor of 52.6 percent. As used herein, a compressibility factor of 57 percent indicates that, upon application of pressure, the underlayer material will compress to a thickness which is about 57 percent of its original thickness. Also as used herein, a recoverability of 86 percent indicates that after removal of the application of a load, the underlayer material will recover to a thickness of about 86 percent of its thickness prior to loading. As used herein, flexibility ratio indicates that the material is capable of formation into a roll having a minimum diameter of five times the thickness of the material without damage to the material.

An underlayer material in accordance with the invention preferably has a recoverability factor of at least 75 percent when the material has a compressibility factor of between 70 and 40 percent.

Moreover, when using an underlayer material in accordance with the invention having a thickness of 3/16 of an inch, the laminated product disclosed herein has a weight of about .33 pound per square foot whereas an asphalt cork has a weight of approximately 2 pounds per square foot. Thus, it is apparent that significantly improved properties are obtained with a product which is considerably lighter and easier to install.

In addition, the disclosed laminate 31 provides total conformation to a finished floor or sub-floor, thus eliminating hollows or dead spots which sometimes result when using more rigid materials such as fiberboard. In addition, the disclosed laminate is, because of the asphalt impregnated sheet, moisture resistant.

Another significant advantage of the disclosed laminate is a high thermal rating of .38 "K." Still further, the disclosed laminate has especially significant sound deadening properties which provide superior impact noise resistance. Use of the laminated underlayer material disclosed herein also provides an underlayer with fewer joints thereby also contributing to reduced sound and thermal transmissabilities.

While the preferred embodiment is disclosed as having an average density of 12 pounds per cubic foot, it should be understood that the invention herein disclosed comprehends the use of natural corks having average densities between 10 pounds and 14 pounds per cubic foot. It is also to be understood that various of the features of the invention can also be obtained when employing backings other than a 15 pound asphalt impregnated sheet. In this regard, the invention contemplates employing other backing materials which would provide moisture resistance and which desirably would serve to assist in retaining the cork layer in roll form. The invention also comprehends the use of binders other than a phenolic resin so long as use of the binder does not materially reduce the compressibility and recoverability factors below those figures given herein. In addition, the invention is not limited to the use of hot asphalt in the bonding process.

Various of the features of the invention are set forth in the following claims.

What is claimed is:

1. An underlayer material comprising a laminate including a layer consisting essentially of natural cork united by a phenolic resinous binder to form a self-supporting sheet having a density of approximately 12 pounds per cubic foot and an asphalt impregnated backing.

2. An underlayer material in accordance with claim 1 wherein said asphalt impregnated backing is a 15 pound sheet.

3. An underlayer material in accordance with claim 1 wherein said laminate has a thickness of between 1/4 and 1/8 of an inch.

4. An underlayer material in accordance with claim 1 wherein said laminate is elongated and is in roll form.

5. An underlayer material in accordance with claim 4 wherein said laminate is self-resistant to unrolling.

6. An underlayer material in accordance with claim 1 wherein said laminate has a compressibility of at least 50 percent and a recoverability of at least 75 percent.

7. An underlayer material comprising a laminate which has a thickness of between 1/4 and 1/8 of an inch, and which is elongated and in roll form, and which is self-resistant to unrolling, and which has a compressibility of at least 50 percent and a recoverability of at least 75 percent, said laminate comprising a layer of natural cork sheet having a density of approximately 12 pounds per cubic foot, and including a binder of phenolic resin, and a 15 pound asphalt impregnated sheet bonded to one face of said natural cork layer.

8. An underlayer material comprising a laminate which has a thickness of between 1/4 and 1/8 of an inch, and which is elongated and in roll form, and which is self-resistant to unrolling, and which has a compressibiity of at least 50 percent and a recoverability of at least 75 percent, said laminate consisting essentially of natural cork united by a resinous binder to form a self-supporting sheet having a density of approximately 12 pounds per cubic foot, and a 15 pound asphalt impregnated sheet bonded to one face of said natural cork sheet.

9. An underlayer material comprising a laminate which has a thickness of between 1/4 and 1/8 of an inch, and which is elongated and in roll form, and which is self-resistant to unrolling, and which has a compressibility of at least 50 percent and a recoverability of at least 75 percent, said laminate consisting essentially of natural cork united by a phenolic resinous binder to form a self-supporting sheet having a density of approximately 12 pounds per cubit foot, and an asphalt impregnated sheet bonded to one face of said natural cork sheet.

References Cited

UNITED STATES PATENTS

| | | | |
|---|---|---|---|
| Re. 18,582 | 8/1932 | Campbell | 161—238X |
| 1,612,885 | 1/1927 | Robinson | 161—211X |
| 1,637,762 | 8/1927 | Campbell | 161—211X |
| 1,646,187 | 10/1927 | Busch | 161—168 |
| 1,661,422 | 3/1928 | Genest | 161—211 |
| 1,848,329 | 3/1932 | Ellis | 161—211 |
| 2,163,372 | 6/1939 | Claxton et al. | 161—211X |
| 2,722,869 | 11/1955 | Archer | 264—123X |

HAROLD ANSHER, Primary Examiner

G. W. MOXON II, Assistant Examiner

U.S. Cl X.R.

161—165, 211, 236; 206—59